United States Patent [19]
Haneda et al.

[11] Patent Number: 5,257,047
[45] Date of Patent: Oct. 26, 1993

[54] CONTROL APPARATUS AND METHOD FOR IMAGE-FORMING SYSTEM

[75] Inventors: Satoshi Haneda; Masakazu Fukuchi, both of Tokyo, Japan

[73] Assignee: Konica Corporation, Tokyo, Japan

[21] Appl. No.: 775,149

[22] Filed: Oct. 9, 1991

[30] Foreign Application Priority Data

Oct. 16, 1990 [JP] Japan .................... 2-277347

[51] Int. Cl.⁵ .......................... G01D 15/14
[52] U.S. Cl. ..................... 346/160; 346/108; 346/1.1; 346/157
[58] Field of Search ............ 346/108, 160, 1.1, 157; 250/236

[56] References Cited

U.S. PATENT DOCUMENTS

| | | | |
|---|---|---|---|
| 3,555,280 | 1/1971 | Richards, Jr. | 250/236 |
| 4,019,186 | 4/1977 | Dressen et al. | 250/236 |
| 4,429,220 | 1/1984 | Noguchi | 250/236 |
| 4,581,617 | 4/1986 | Yoshimoto et al. | 346/108 |
| 4,823,002 | 4/1989 | Saito | 250/236 |
| 4,829,326 | 5/1989 | Emmett et al. | 346/157 |
| 4,912,491 | 3/1990 | Hoshino et al. | 346/160 |
| 4,965,597 | 10/1990 | Ohigashi et al. | 346/157 |
| 4,990,771 | 2/1991 | Minoura et al. | 346/108 X |
| 5,081,477 | 1/1992 | Gibson | 346/160 |

FOREIGN PATENT DOCUMENTS

60-100113 6/1985 Japan .
2-51119 2/1990 Japan .

*Primary Examiner*—Benjamin R. Fuller
*Assistant Examiner*—Randy W. Gibson
*Attorney, Agent, or Firm*—Frishauf, Holtz, Goodman & Woodward

[57] ABSTRACT

In an image-forming system where a photosensitive belt is exposed to and scanned with a laser beam to form an image on the surface of the photosensitive belt, a standard pattern having laser beam-transmitting portions and non-transmitting portions arranged alternately in the direction of main scanning of the laser beam is formed on the photosensitive belt, and light-detecting means is disposed to detect the intensity of the laser beam transmitted through the transmitting portions. Dislocation of the focal point of the laser beam is detected based on the difference of the detected beam intensity between the transmitting portions and the non-transmitting portions, and based on the result of this detection, a collimator lens is moved in the direction of the optical axis to correct the dislocation of the focal point.

20 Claims, 8 Drawing Sheets

CONTROL APPARATUS AND METHOD FOR IMAGE-FORMING SYSTEM

BACKGROUND OF THE INVENTION

1. Field of the Invention

The present invention relates to an image-forming system which is constructed so that an optical beam such as a laser beam is exposed and scanned on an image-forming medium, such as a printer, a copying machine or a facsimile. More particularly, the present invention relates to a control apparatus for this image-forming system, which detects dislocation of the focal point of an optical beam and corrects the detected dislocation of the focal point automatically.

2. Description of the Related Art

Recently, an image-forming system comprising a laser writing unit where a laser beam modulated according to an image signal is exposed and scanned on a photosensitive image-forming medium by a polygonal mirror scanner, such as a printer, a copying machine or a facsimile, is widely and ordinarily used.

It is desired that an image information having a high quality and a high density will be obtained by this image-forming system. However, it often happens that dislocation of the focal point of the laser beam is caused by a change of the surrounding environment, and the beam diameter on the image-forming medium is caused by this dislocation of the focal point, resulting in reduction of the image quality.

As the means for overcoming this disadvantage, there can be mentioned a method as disclosed in Japanese Unexamined Patent Publication No. 60-100113 or Japanese Unexamined Patent Publication No. 02-51119. According to this known method, there are disposed detecting means for receiving a laser beam to be scanned on an image-forming medium and detecting dislocation of the focal point of the laser beam, and means for correcting the detected dislocation of the focal point of the laser beam by movement of a lens.

However, the laser printer disclosed in Japanese Unexamined Patent Publication No. 60-100113 is defective in that since a 4-divided light-receiving element is used as the means for detecting dislocation of the focal point and dislocation of the focal point is detected by the astigmatism, it is difficult to stably detect dislocation of the focal point of the laser beam, which is scanned at a high speed.

The scanning optical apparatus disclosed in Japanese Unexamined Patent Publication No. 02-51119 is constructed so that detecting means for detecting dislocation of the focal point of a laser beam is located at a position separate from an image-forming medium and optically equivalent to the image-forming medium to detect the bundle-state of a laser beam formed by the terminal portion of a group of lenses such as $f\theta$ lens. Accordingly, dislocation of the focal point cannot be accurately detected unless the lens characteristics of the terminal portion of the lens group are especially improved.

SUMMARY OF THE INVENTION

The present invention is to solve the above-mentioned problems of the conventional techniques and it is primary object of the present invention to stably detect dislocation of the focal point of an optical beam scanned at a high speed.

Another object of the present invention is to accurately detect dislocation of the focal point without being influenced by the lens characteristics, while the detection is not performed based on the optical beam formed at the terminal portion of the lens group.

A further object of the present invention is to automatically correct the focal point of the optical beam based on the detected dislocation of the focal point and stably maintain a high image quality.

A further object of the present invention is to provide a control apparatus and control method for an image-forming system, in which prior to actual formation of images, adjustment of the optical beam scanning unit including adjustment of the focal point of the optical beam can be automatically performed at a high accuracy.

According to the control apparatus and control method of the present invention for an image-forming system where an optical beam is exposed and scanned on an image-forming medium, a standard pattern having optical beam transmitting or reflecting portions arranged alternately is formed in the main scanning direction of the optical beam. The intensity of the optical beam transmitted through or reflected from the standard pattern is detected and dislocation of the focal point is detected based on the detected intensity and the focal point is adjusted.

More specifically, dislocation of the focal point is detected based on the change of the intensity of the optical beam when the optical beam scans on the standard pattern formed on the image-forming medium, and automatic adjustment is performed so that the predetermined position of the focal point is maintained and dislocation of the focal point is thus detected based on the optical beam within the scanning region of the image-forming medium. The standard pattern may be irradiated with the optical beam in the stationary state, but dislocation of the focal point can be detected even if scanning is performed at a high speed as in the case of formation of an image.

The present invention can be applied to a structure in which an image-forming medium is moved and guided on a guide member while having a sliding contact therewith and is shifted in a subsidiary scanning direction orthogonal to the main scanning direction of the optical beam. In this case, the intensity of the optical beam transmitted or reflected from the standard pattern is detected by detecting means disposed at the scanning position of the optical beam and the predetermined position on the sliding surface of the guide member, corresponding to the setting position of the standard pattern, whereby high-accuracy detection can be performed with a simple structure.

Moreover, when the intensity of the optical beam transmitted or reflected from the standard pattern or the optical beam reflected form the non-transmitting portion of the standard pattern is measured, the maximum value Smax and minimum value Smin of the detected intensity are determined, and the signal-to-noise ratio is calculated from these maximum and minimum values Smax and Smin according to the following formula:

$$\text{Signal-to-noise ratio} = \frac{Smax - Smin}{Smax + Smin}$$

Dislocation of the optical beam can be detected by comparing the calculated signal-to-noise ratio with the predetermined value or range of the signal-to-noise ratio causing dislocation of the focal point.

Namely, the signal-to-noise ratio decreases when the diameter of the optical beam on the image-forming medium becomes larger than the initial value, and the signal-to-noise ratio increases as the above-mentioned diameter becomes smaller than the initial value. Therefore, the state of dislocation of the focal point can be detected based on the signal-to-noise ratio.

Still further, if the optical beam-forming lens system comprises a collimator lens, by moving this collimator lens in the direction of the optical axis, the position of the focal point can be adjusted according to the detected dislocation of the focal point.

Moreover, the image-forming apparatus comprising an image-forming medium having a standard pattern as mentioned above can be constructed so that an electrostatic latent image is formed on the surface of the image-forming medium by exposure and scanning of an optical beam, this electrostatic latent image is visualized to a toner image and the toner image is transferred onto a transfer material.

Preferably, while the position of the focal point is adjusted according to the detected dislocation of the focal point, scanning in the subsidiary scanning direction orthogonal to the main scanning direction of the optical beam is stopped.

If scanning in the subsidiary scanning direction is thus stopped, the optical beam can be continuously scanned on the standard pattern, and the result of the adjustment can be promptly fed back and the adjustment of the position of the focal point can be promptly completed.

Still further, the above-mentioned standard pattern can also be used as a resist mark for determining the position of initiation of at least one of main scanning of the optical beam and the subsidiary scanning in a direction orthogonal to the main scanning direction.

More specifically, since the standard pattern is formed on the image-forming medium, if the standard pattern is arranged at the standard position of the main scanning direction of the optical beam on the image-forming medium, detection of the standard pattern by light-detecting means can be utilized not only for adjustment of the position of the focal point but also for determination of the standard of the main scanning direction. Similarly, if the standard pattern is arranged at the standard position of the subsidiary scanning direction, the detection of the standard pattern by light-detecting means can also be utilized for determination of the standard in the subsidiary scanning direction.

In the case where the image-forming medium is an annular medium obtained by bonding both the ends of a belt-like image-forming medium and the image-forming medium is circulated relatively to the main scanning position of the optical beam, the standard pattern can be formed at a predetermined position close to the above-mentioned bonded portion.

In this arrangement, the detection of the standard pattern by the detecting means can also be utilized for detection of the bonded portion, that is, as the standard in the subsidiary direction.

Preferably, the standard pattern is formed on the scanning-initiating side of both the ends of the image-forming medium in the main scanning direction of the optical beam. In this case, the detection of the standard pattern by the detecting means can also be utilized as the standard in the main scanning direction.

Other objects and features of the present invention will become apparent from the following description of embodiments made with reference to the accompanying drawings.

DETAILED DESCRIPTION OF THE PREFERRED EMBODIMENTS

Embodiments of the control apparatus and method for an image-forming system according to the present invention are illustrated in FIGS. 1 through 11.

Figure 1:
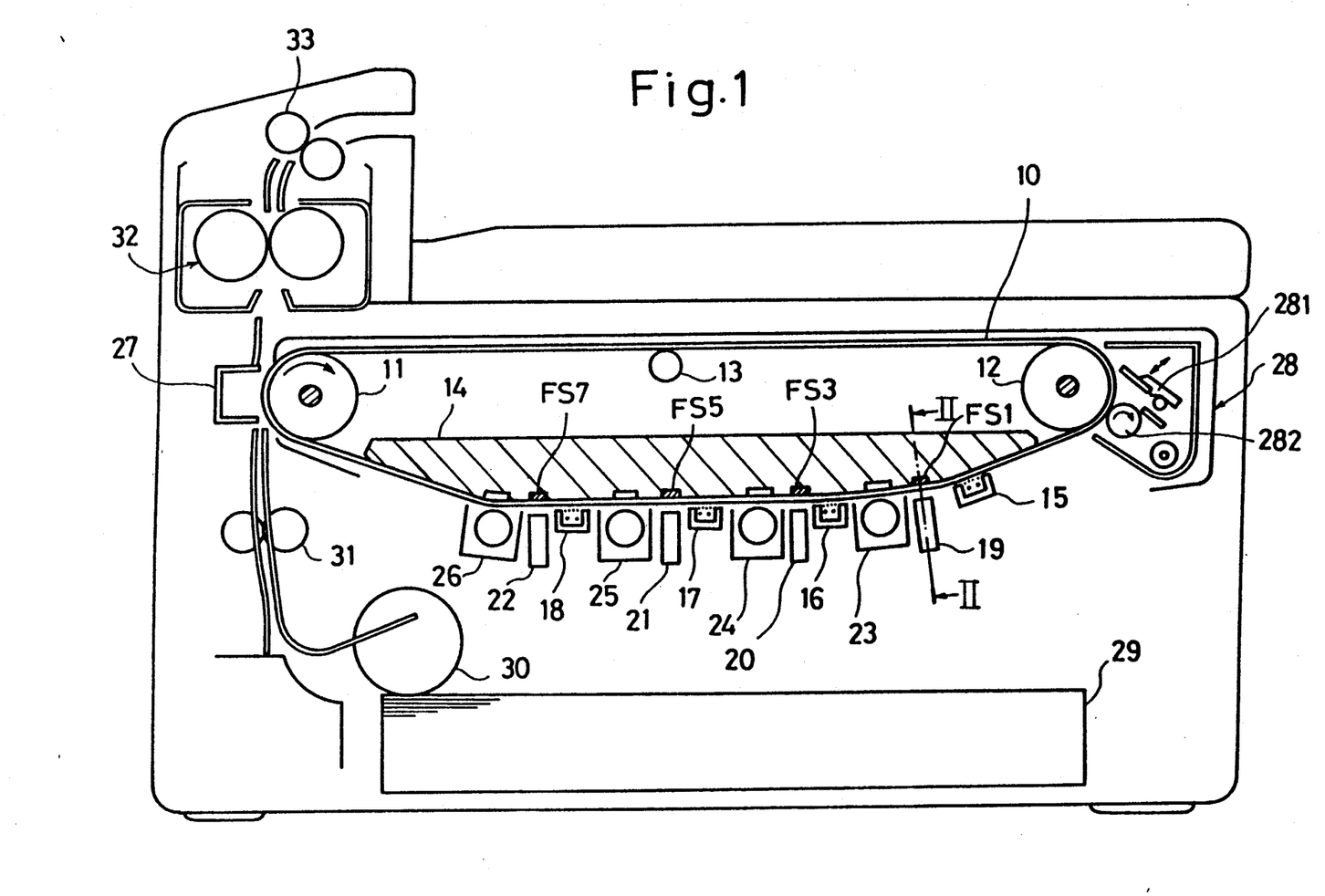
FIG. 1 is a sectional view illustrating the outline of the structure of a color printer provided with a belt-like image-forming medium as an embodiment of the present invention.
Figure 2:
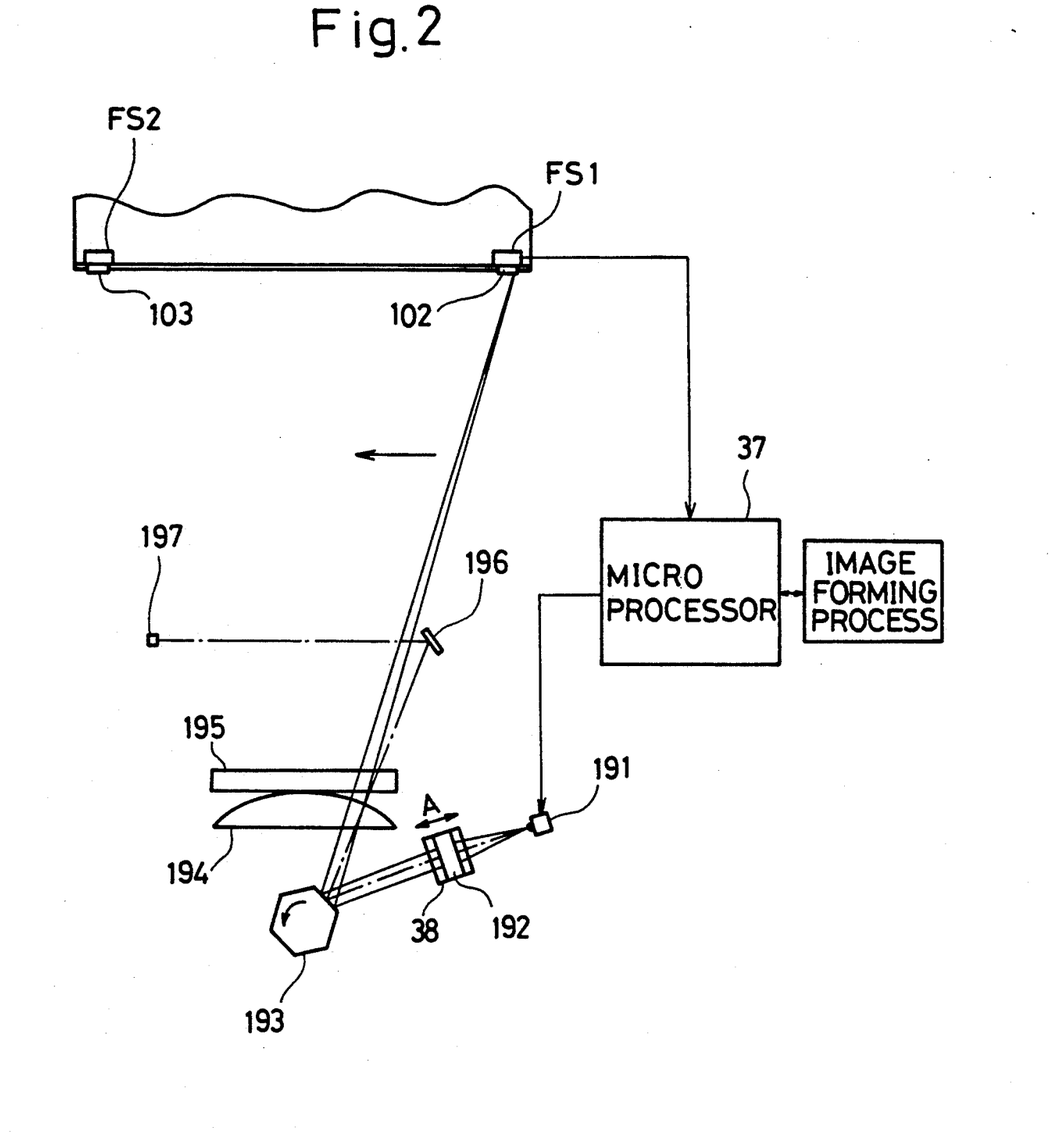
FIG. 2 is a sectional diagram taken along sectional line II—II of FIG. 1 illustrating a scanning optical system of a laser writing unit.

FIG. 1 is a diagram illustrating the outline of the structure of a color printer as an image-forming apparatus provided with a belt-like image-forming medium according to one embodiment of the present invention. FIG. 2 is a view showing the section A—A of FIG. 1, which illustrates the outline of the structure of a laser writing unit in the color printer shown in FIG. 1. A photosensitive belt 10 as the image-forming medium is formed by coating or vacuum-depositing a photoconductor on a flexible belt and bonding both the ends to each other to form an annular shape. The photosensitive belt 10 is hung between rotary rollers 11 and 12 and is rotated while keeping a sliding contact with a guide member 14 as the standard by a tension given by a tension roller 13, whereby the photosensitive belt 10 is circulated and delivered while maintaining the photosensitive surface at a certain position relatively to the guide member 14 as the standard.

If the above structure is adopted, the peripheral photosensitive surface of the photosensitive belt 10 is always kept in a certain positional relation to the surface of the guide member 14 even during delivery and a long width can be given to the image-forming apparatus having a large radius of curvature. Accordingly, many laser writing units having the same shape can be equidistantly arranged in parallel to one another.

In the present embodiment, the photosensitive belt 10 is used as the image-forming medium, but the image-forming medium is not limited to the photosensitive belt 10 and a known image-forming medium having a photosensitive layer, such as a photosensitive material drum, can be used.

A plurality of charging means, a plurality of light exposure means, developing means packed with four kinds of toners differing in the color, transfer means and cleaning means are arranged on the periphery of the photosensitive belt 10.

The charging means for uniformly charging the photosensitive layer on the surface of the photosensitive belt 10 with a predetermined polarity comprises known chargers 15 through 18, such as corona chargers and scorotron chargers.

The light exposure means comprises semiconductor laser writing units 19 through 22 for light exposure and scanning of the surface of the photosensitive belt 10 charged by the chargers 15 through 18 by the laser beam (optical beam) to form an electrostatic latent image.

The developing means comprises four developers 23 through 26 charged with developing agents differing in the color, for example, yellow (Y), magenta (M), cyan (C) and black (Bk) toners (developing agents). Each of the developers 23 through 26 has a function of visualizing the electrostatic latent image on the photosensitive belt 10 to a toner image by the non-contact developing method. The non-contact developing method is different from the contact developing method in that the precedent toner image formed on the photosensitive belt 10 is not damaged, the movement of the photosensitive belt 10 is not inhibited, and therefore, a good color image can be formed.

The transfer means comprises a transfer device 27 such as a transfer corona discharger and exerts a function of transferring the toner image formed on the photosensitive belt 10 onto a transfer material 27. A known transfer member such as a transfer drum can be used as the transfer means instead of the transfer device 27.

The cleaning means 28 comprises a cleaning blade 281 and a cleaning roller 282, and the cleaning means 28 is constructed so that only at the time of cleaning, the cleaning means 28 is pressed to the surface of the photosensitive belt 10 to clean the photosensitive belt 10.

The color image-forming process using the color printer having the above-mentioned structure is conducted according to the following procedures.

When an image signal of a first color, output from an image reader arranged separately from the apparatus proper, is input in the laser writing unit 19, a laser beam modulated according to the image signal by a semiconductor laser 191 in the laser writing unit 19 is generated. This laser beam is rotated and scanned by a polygonal mirror 193 rotated by a driving motor (not shown) through a collimator lens 192, and the laser beam is projected on the photosensitive surface of the photosensitive belt 10 uniformly charged with a predetermined polarity by the charger 15 through fθ lens 194 and cylindrical lens 195, with the width direction of the photosensitive belt 10 being as the main scanning direction, whereby a bright line is formed.

With respect to the subsidiary scanning direction orthogonal to the main scanning direction, a resist mark, described hereinafter, corresponding to a specific position of the photosensitive belt 10 is detected by a photosensor, and the position in the subsidiary direction, in which modulation of the semiconductor laser 191 is initiated according to the image signal, is determined based on this detection signal.

When scanning is initiated, with respect to the main scanning direction, the laser beam is detected by an index sensor 197 through a mirror 196 disposed on the main scanning-initiating side outside the irradiation region of the photosensitive belt 10, and modulation of the semiconductor laser 191 by the image signal of the first color is initiated based on the detected signal and the modulated laser beam is scanned on the surface of the photosensitive belt 10.

Accordingly, a latent image corresponding to the first color is two-dimensionally formed on the surface of the photosensitive belt 10 uniformly charged by main scanning by the laser beam and subsidiary scanning by the delivery of the photosensitive belt 10. This latent image is developed by the developing device 23 packed with the yellow toner as the first color toner and a yellow toner image is formed on the surface of the photosensitive belt 10. Then, the photosensitive belt 10 retaining the yellow toner image on the surface thereof is delivered and the process goes into the subsequent step of forming an image of the second color.

More specifically, as in the case of the image signal of the first color (yellow), the photosensitive belt 10 having the yellow toner image formed thereon is delivered to the position of the next charger 16 and is charged by the charger 16, and a resist mark corresponding to a specific position of the photosensitive belt 10 is detected by the photosensor and modulation of a semiconductor laser 201 of the laser writing unit 20 by the image signal of the second color is initiated based on the detected signal and the laser beam generated at the semiconductor laser 201 is projected on the photosensitive surface of the photosensitive belt 10 uniformly charged with a predetermined polarity by the charger 16 through the above-mentioned scanning lens system comprising a polygonal mirror 203, whereby a latent image is formed. The latent image is developed by the developing device 24 charged with a magenta toner as the second color toner. The magenta toner is formed in the presence of the already formed yellow toner image.

Each of the members of the laser writing unit 20 has the same structure and function as those of the member of the above-mentioned laser writing unit 19 if the last figure of the reference numeral is the same.

The photosensitive belt 10 having a magenta toner image as the second color toner image formed thereon is similarly delivered and is uniformly charged with the charger 17 as in the case of the image signal of the second color, and a latent image is formed by the laser writing unit 21 corresponding to the third color and developed by the developing device 25 charged with a cyan toner to form a cyan toner image.

The photosensitive belt 10 having the cyan toner image as the third color toner image formed thereon is further delivered, and as in case of the image signals of the first, second and third colors, the photosensitive belt 10 is uniformly charged by the charger 18 and a latent image is formed by the laser writing unit 22. The latent image is developed by the developing device 26 charged with a black toner and the black toner image is overlapped on the above yellow, magenta and cyan toner images to form a four-color overlapped image on the surface of the photosensitive belt 10. Namely, a multi-color toner image is formed by every one rotation of the photosensitive belt 10.

A direct current or alternating current bias voltage is applied to the developing devices 23 through 26 and the substrate of the photosensitive belt 10 is earthed, so that a reversal phenomenon (jumping phenomenon) is conducted while maintaining a non-contact state between the developing devices 23 through 26 and the photosensitive belt 10.

Either a one-component developer or a two-component developer can be used for this non-contact development. If the one-component developer is used, means for controlling the toner concentration need not be disposed and the size of the apparatus can be diminished, but the method using the two-component developer is excellent in the development stability.

The multi-color toner image formed on the surface of the photosensitive belt 10 in the above-mentioned manner is transferred on a transfer material taken out from a paper feed cassette 29 by a paper feed roller 30 and supplied synchronously with the multi-color toner image by a timing roller 31. The transfer is conducted while applying a high voltage of a polarity reverse to that of the toner to the transfer device 27.

The transfer material having the multi-color toner image transferred thereon is assuredly separated from the photosensitive belt 10 which abruptly changes the direction along the rotary roller 11, and the toner is melted and fixed by fixing means 32 and the transfer material is discharged from the apparatus proper through a paper-discharging roller 33.

After the transfer of the multi-color toner image to the transfer material, the photosensitive belt 10 is delivered clockwise in FIG. 1, and cleaning and removal of the residual toner are performed by the cleaning means 28 comprising a cleaning blade 281 and a cleaning roller 282 in the state compressed to each other. After the cleaning operation the process for forming a new image is started again.

The color printer (image-forming apparatus) using toners according to the present embodiment comprises image-forming means including a plurality of chargers 15 through 18, a plurality of laser writing units 19 through 22 and developing devices 23 through 26, which are arranged on the periphery of the photosensitive belt 10, and there is adopted a so-called one-pass method in which yellow, magenta, cyan and black toner images are overlapped to from a toner image by one rotation of the photosensitive belt 10. However, the present invention is not limited to the one-pass method, but there can also be adopted a polyrotation method in which formation of a latent image and development are performed by respective rotations of the image-forming medium.

The adjustment of the laser writing units 19 through 22, including the adjustment of the laser beam, to be conducted prior to practical formation of an image, will now be described.

As the adjustment of the laser writing units 19 through 22, there can be mentioned adjustment of the focal point of each of the units 19 through 22, adjustment of dislocation in the subsidiary scanning direction and adjustment of dislocation in the main scanning direction. In the present embodiment, the following structure is adopted so that these adjustments are made possible.

Figure 3:
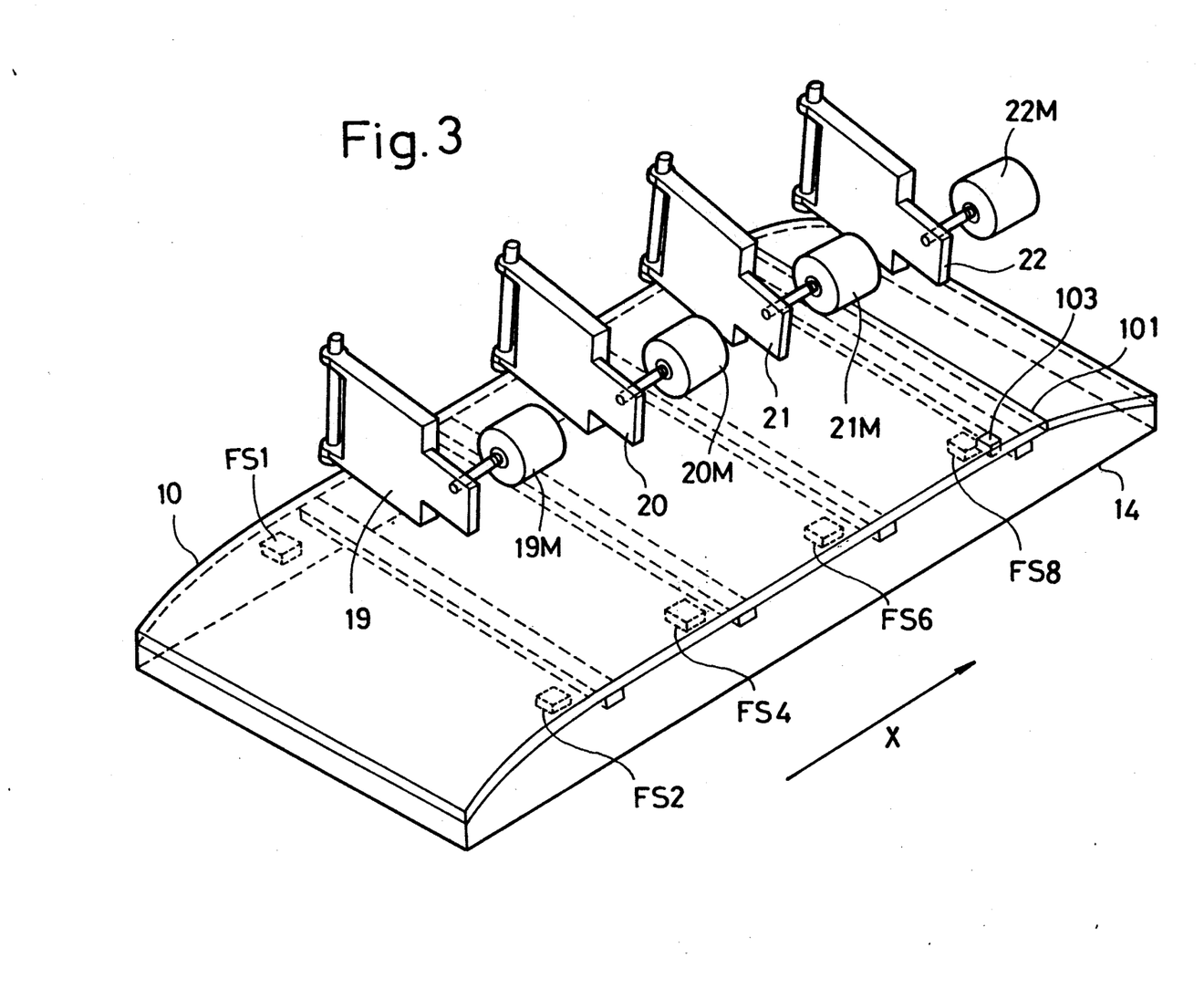
FIG. 3 is a perspective view illustrating the positional relation between the laser writing unit and the image-forming medium in the embodiment.

As shown in FIG. 3, through holes or resist marks 102 and 103 formed by bonding light-transmitting films to such through holes are formed as the laser beam-transmitting resists on both the end portions located apart by a predetermined distance from the bonded portion 101 of the photosensitive surface of the photosensitive belt 10, so that the resist marks 102 and 103 confront each other in parallel to a scanning line L of the main scanning direction of the laser beam.

The resist mark 102 formed on the upstream side in the main scanning direction also acts as the standard pattern for detecting dislocation of the focal point of the laser beam. Namely, the resist mark 102 is arranged to form a stripe pattern crossing the main scanning direction of the laser beam, that is a stripe pattern extending in the subsidiary scanning direction.

Figure 4:
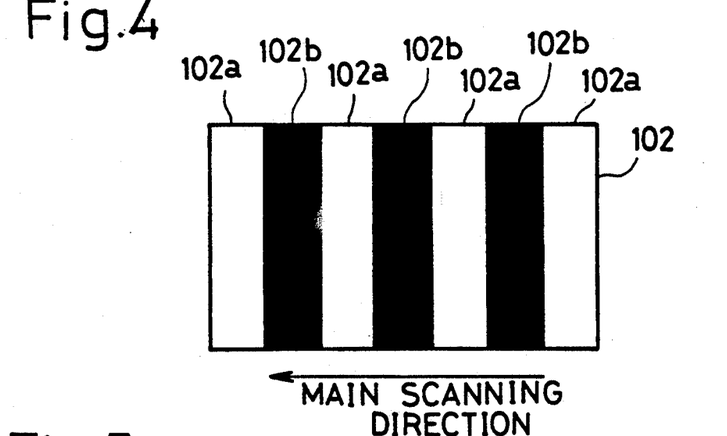
FIG. 4 is a plane view showing a resist mark acting also as a standard pattern for adjusting the focal point of a laser beam.

More specifically, as shown in FIG. 4, the resist mark 102 comprises slit-like piercing transmitting portions 102a transmitting a laser beam and absorbing portions 102b absorbing (not transmitting) a laser beam, which have the same width and are alternately arranged in the main scanning direction. Preferably, the distance between the transmitting portion 102a and the absorbing portion 102b is substantially the same as or larger than the diameter of the laser beam (for example, about 80 $\mu$m in case of a resolution of 400 dots per inch).

The laser beams transmitted through the resist marks 102 and 103 are detected by photosensors described below, respectively, and the standard for adjustment of the focal point and determination of exposure-initiating points in the main scanning direction and subsidiary scanning direction and the standard for detection of dislocation of the scanning line L in the subsidiary scanning direction are obtained by detecting the intensity of the transmitted light by the photosensor and detecting the bonded portion 101 from the detected value of the photosensor.

As shown in the drawings, a plurality of concavities are formed in confirmity with the positions of the laser writing units 19 through 22 and the resist marks 102 and 103, and photosensors FS1 through FS8 are arranged as the light-detecting means in these concavities. The photosensors FS1 through FS8 are disposed to detect the intensities of the beams transmitted through the resist marks 102 and 103 among laser beams scanned in the laser writing units 19 through 22.

Alternatively, there can be adopted a method in which reflecting members are arranged as the resist marks 102 and 103 on the photosensitive belt 10 and reflected beams from the exposed light are received by a photosensor. In this case, for example, a reflecting member is arranged only instead of the standard pattern-transmitting portion 102a of the resist mark 102, so that reflecting portions and non-reflecting portions are alternately arranged.

In the present embodiment, all of the laser writing units 19 through 22 have the same construction and function. Accordingly, in the illustration of the adjusting function, given below, the laser writing unit 19 is selected as a representative, and the same operations are conducted in other laser writing units 20 through 22.

Adjustment of the focal point of the laser beam will now be described.

Figure 5:
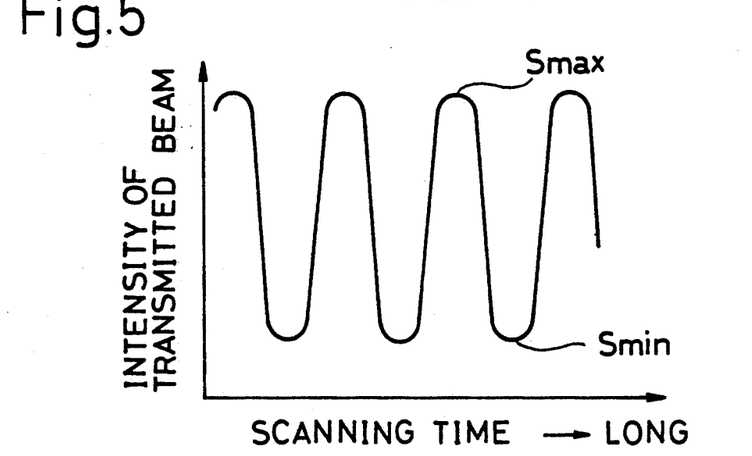
FIG. 5 is a graph illustrating the relation of the scanning time of the laser beam to the intensity of the laser beam transmitted through the resist mark.

FIG. 5 illustrates the relation between the scanning time of the rotated and scanned laser beam and the transmitted light intensity detected by the photosensor FS1 when the resist mark 102 is irradiated with the laser beam.

When the transmitting portion 102a of the resist mark 102 is irradiated with the laser beam, the transmitted light intensity detected by the photosensor FS1 (light-detecting means) is large, but when the absorbing portion 102b is irradiated, the transmitted light intensity becomes small. Therefore, the transmitted light intensity fluctuates according to the stripe pattern. Supposing that the largest transmission intensity is Smax and the smallest transmission intensity is Smin, when the laser beam is in focus, the difference between Smax and Smin is large. In the case where the laser beam is out of focus and the beam diameter is large, even if the absorbing portion 102b is irradiated, the intensity of the transmitted light detected by the photosensor FS1 through the transmitting portion 102a increases and hence, the difference between Smax and Smin becomes small.

A micro-processor 37 is arranged as the means for detecting dislocation of the focus to judge whether or not the laser beam is in focus, by using the transmission intensity obtained by the photosensor FS1, and to drive and control adjusting means 38 based this judgement. The adjusting means 38 is disposed to move the collimator lens 192 in the direction of the optical axis (direction A in FIG. 2) and adjust the focal point of the laser beam.

The detection as to whether or not the laser beam is in focus is performed in the following manner.

More specifically, the micro-processor 37 detects Smax and Smin from data of the transmission intensity obtained from the photosensor FS1 to determine the signal-to-noise ratio. This signal-to-noise ratio is calculated according to the following formula:

$$\text{Signal-to-noise ratio} = \frac{Smax - Smin}{Smax + Smin}$$

If the signal-to-noise ratio is at a predetermined level, the laser beam is in focus. If the signal-to-noise ratio is lower than the predetermined level, the laser beam is out of focus and the beam diameter becomes larger than the predetermined value.

If the signal-to-noise ratio exceeds the set value, the beam diameter becomes smaller than the predetermined value, and if exposure and scanning are continued in this state, a gap is produced between scanned beams and the image quality is degraded. Accordingly, it is not sufficient even if the signal-to-noise ratio is larger than the set value, but the signal-to-noise ratio should be at a set level or within a set range.

Figure 6:
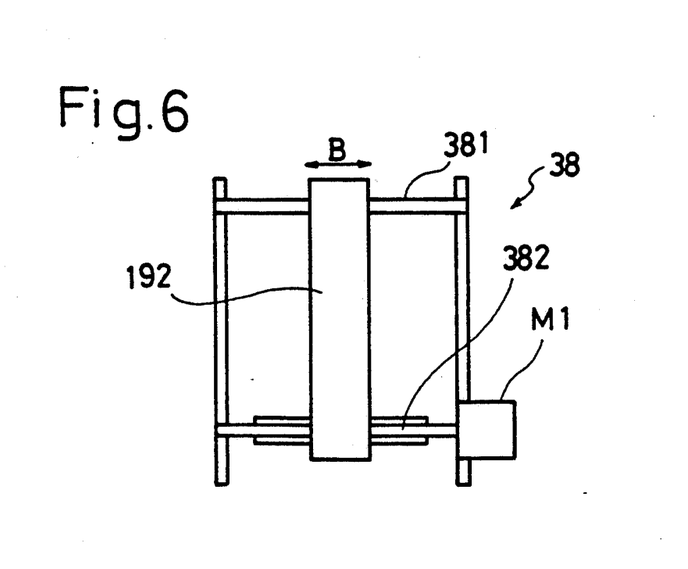
FIG. 6 is a plane view illustrating adjusting means for adjusting the focal point of the laser beam.

The adjusting means 38 will now be described with reference to FIG. 6.

A collimator lens 192 is arranged movably in the direction of the optical axis, that is, in the direction B, by a guiding shaft 381 and a threaded rotary shaft 382. Namely, the collimator lens 192 is advanced and retreated in the direction of the optical axis by the rotary shaft 382 rotated with rotation of the motor M1 so that the laser beam becomes in focus.

The motor M1 is a pulse motor and the rotation quantity of the motor M1 is controlled based on the signal-to-noise ratio by the micro-processor 37. The collimator lens 192 is fixed at a position where the signal-to-noise ratio is at the set value, that is, at a position where the laser beam is in focus.

The adjustment of the focal point of the laser beam based on the intensity of the optical beam through the resist mark 102 formed as standard stripe pattern has been described. Since in this adjustment the laser beam is scanned on the standard pattern of the resist mark 102 on the surface of the photosensitive belt 10 and a structure in which the standard pattern is irradiated through the end of a laser beam-forming lens system not practically used for the light exposure is not adopted, dislocation of the focal point can be detected and adjusted at a high accuracy without any influence of degradation of the characteristics at the end of the lens.

At the time of the adjustment of the focal point of the laser beam, the photosensitive belt 10 is not rotated and the resist mark 102 is stopped at the scanning position of the laser, and the above adjustment is repeated until the laser beam becomes in focus. After the adjustment of the focal point is completed in one laser writing unit, the photosensitive belt 10 is moved to the laser-scanning point of the next laser writing unit and is stopped at this point, and the operation of adjusting focal point in this laser writing unit is repeated.

In the present embodiment, one resist mark 102 is formed and the resist mark is moved to the scanning position of each of the laser writing units 19 through 22. However, there can be adopted a method in which four standard patterns like the resist mark 102 are arranged to correspond to the scanning positions of the laser writing units 19 through 22, respectively, and the focal points of the respective laser writing units are simultaneously adjusted at a time.

In the case where adjustment of the laser beam is not completed within a certain time, formation of the image is stopped or formation of the image is performed to final adjustment position, and a warning is given to an operator and the operator is informed of incompletion of the adjustment.

As pointed out hereinbefore, the photosensitive belt 10 is driven and guided while having a sliding contact with the guide member 14, and is delivered in the direction X.

As shown in FIG. 2, a scanning optical unit comprising a semiconductor laser 191, a collimator lens 192, a polygonal mirror 193, a cylindrical lens 195, fθ lens 194, a mirror 196, an index sensor 197 and adjusting means 38 is integrally contained in the laser writing unit 19.

Figure 7:
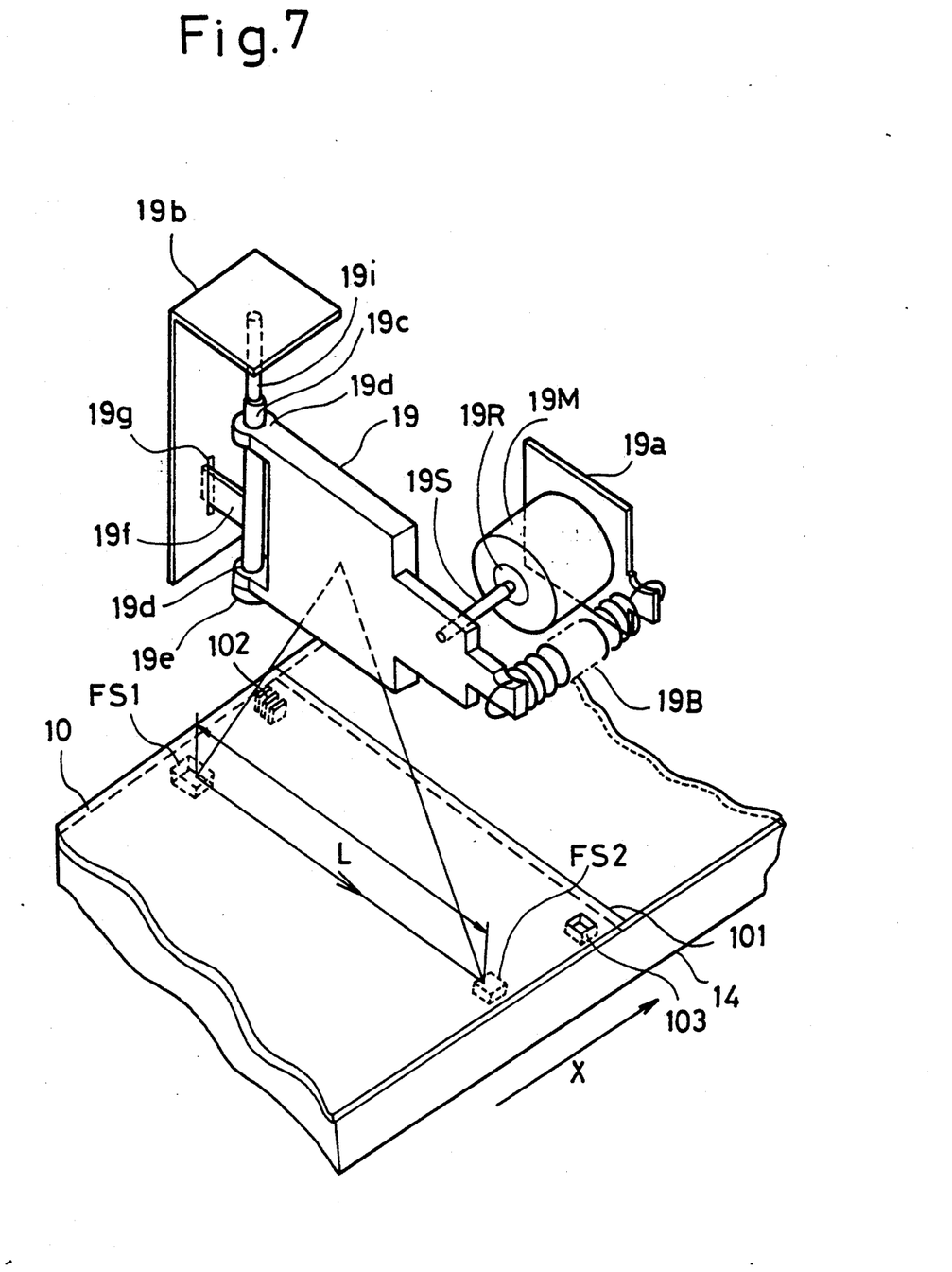
FIG. 7 is a perspective view showing a structure for adjusting an inclination of the main scanning direction of the laser writing unit in the embodiment.

In FIG. 7, the unit 19 having the scanning optical system contained therein is attached to stators 19a and 19b integrally attached to the machine frame through a motor 19M and a collar 19c. The unit 19 is attached at a predetermined mechanical precision (for example, ±0.3 to 0.5 mm) in parallel to a line connecting photosensors FS1 and FS2 formed and arranged in concavities of the guide member 14 to form a scanning line L in the main scanning direction.

In FIG. 7, the collar 19c is fitted in a hole 19d formed on the end of the unit 19 and a stopper 19e is integrally attached to the lower end of the collar 19c to support the collar 19c from below. A rotation stopper 19f is integrally attached to the intermediate portion of the collar 19c and is fitted in a hole 19g of the stator 19g to prevent rotation of the collar 19c.

The motor 19M is a pulse motor fixed to the stator 19a, and the unit 19 is urged toward the stator 19a by a pulling spring 19B to absorb a fluctuation of the adjustment.

A female screw is formed on a rotor 19R of the motor 19M and is screwed with a shaft 19S having a male screw, whereby the shaft 19S is advanced and retreated with rotation of the motor 19M. The base end of the shaft 19S is fixed to the unit 19 and the unit 19 can be oscillated by rotation of the motor 19 with a shaft 19i being as the oscillation shaft. By this oscillation, the scanning line L can be inclined to the delivery direction (subsidiary scanning direction) of the photosensitive belt 10.

Based on output signals from photosensors FS1 and FS2, dislocations in the main scanning direction and subsidiary scanning direction are adjusted. The structures and functions of a main scanning-correcting circuit 550 and a subsidiary scanning-correction circuit 500 for adjusting these dislocations will now be described.

Figure 8:
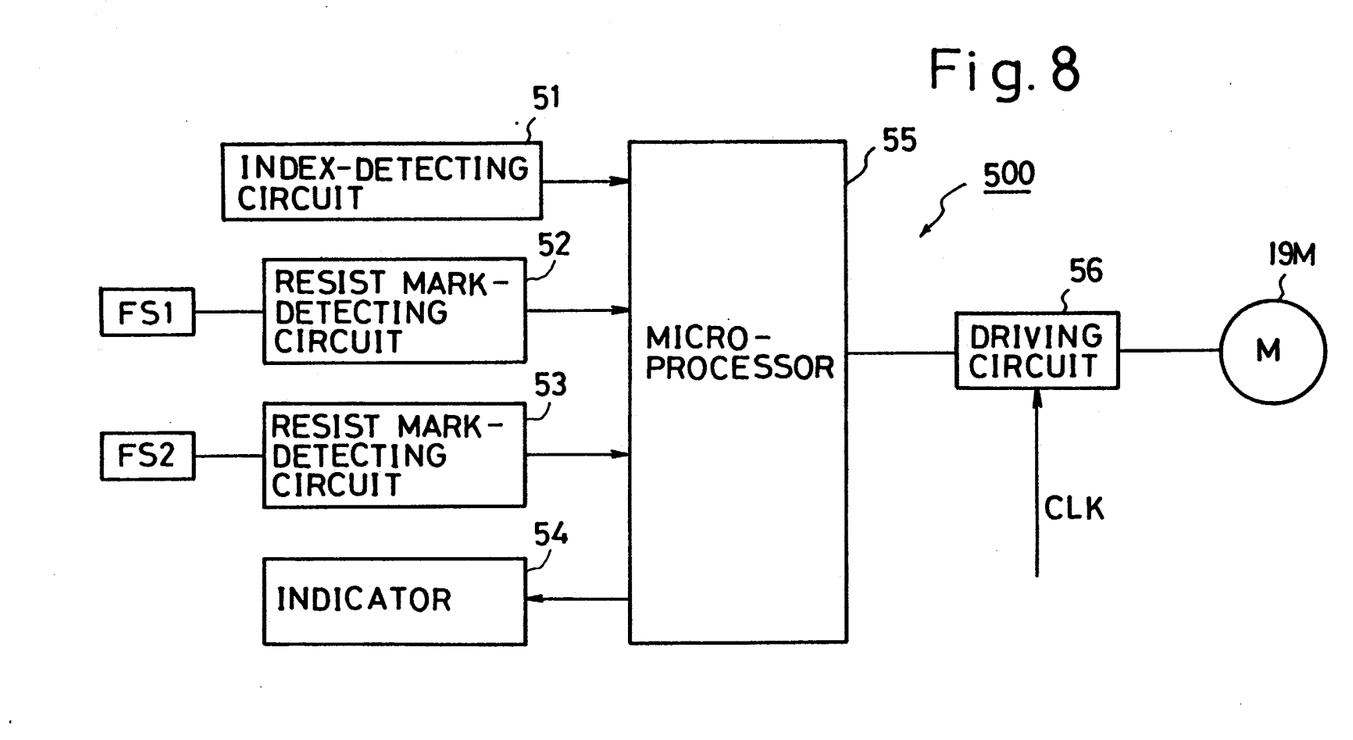
FIG. 8 is a block diagram showing a subsidiary scanning-correcting circuit for correcting dislocation in the subsidiary scanning direction.
Figure 9:
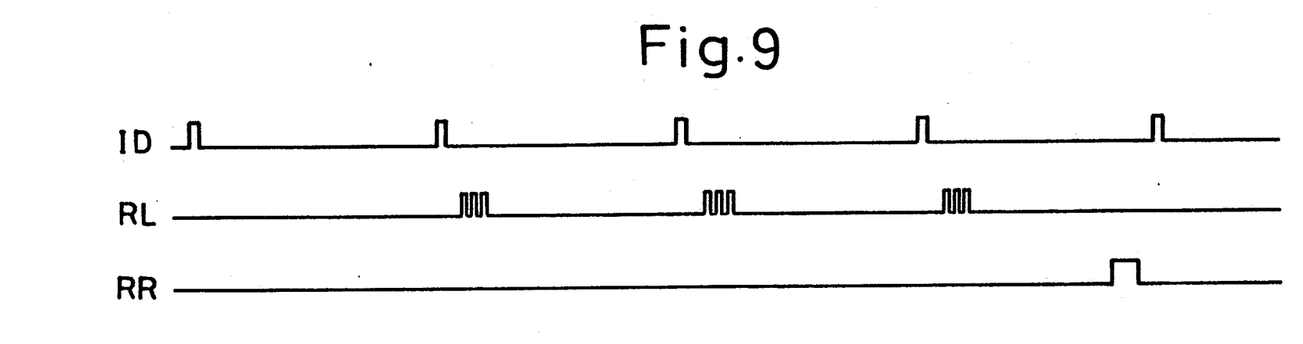
FIG. 9 is a time chart showing operations of the subsidiary scanning-correcting circuit shown in FIG. 8.

FIG. 8 is a block diagram illustrating the subsidiary scanning-correcting circuit for correcting dislocation in the subsidiary direction and FIG. 9 is a time chart illustrating the operation of the subsidiary scanning-correcting circuit.

Adjustment of dislocation in the subsidiary scanning direction is carried out after adjustment of the focal point of the laser beam before formation of the image, or after a predetermined number of prints have been formed.

This adjustment of dislocation in the subsidiary direction is to adjust dislocation of the scanning line in the subsidiary scanning direction (in the delivery direction of the photosensitive belt 10) with in a range of one scanning so that the laser writing units 10 through 22 arranged at a position confronting the photosensitive belt 10 at a high mechanical precision (±0.3 to 0.5 mm) are set at an elevated precision, that is, the line of the laser beam in the main scanning direction is in agreement with the width direction of the photosensitive belt 10.

Scanning lines L of the respective laser writing units 19 through 22 arranged at a predetermined precision do not come out from the photosensors FS1 through FS8 even before the adjustment.

The subsidiary scanning direction-correcting circuit 500 detects dislocation of the scanning line L from the laser writing unit 19 in the subsidiary scanning direction and rotates the motor 19M to oscillate the unit 19 having the scanning optical system contained therein, whereby dislocation of the scanning line L in the subsidiary scanning direction is corrected. The subsidiary scanning direction-correcting circuit 500 comprises a micro-processor 55, an index-detecting circuit 51, resist mark-detecting circuits 52 and 53, an indicator 54, a driving circuit 56, and a pulse motor 121.

The index-detecting circuit 51 compares an output signal from the photosensor 197 receiving the laser beams incident through the mirror 196 with an optional set value to output a rectangular index signal ID, as shown in FIG. 2.

The resist mark-detecting circuits 52 and 53 receive signals from the photosensors FS1 and FS2 receiving beams transmitted through the resist marks 102 and 103 or further compare these signal values or peak values thereof with an optional set value to output rectangular resist signals RL and RR. Incidentally, the laser beam scanning for the resist marks 102 and 103 need not be performed on the entire region in the subsidiary scanning direction, but the scanning region may be limited to the region including the resist marks 102 and 103 based on detection of the belt position by the standard mark formed on the photosensitive belt 10 or an encoder.

The micro-processor 55 stores, in advance, the time of from the point of the detection of the index signal ID to the point of the detection of the resist signals RL and RR, and detects distortion of the scanning line L in the subsidiary scanning direction based on the presence or absence of the resist signal RL or RR within the time of one scanning. The result of the detection is fed out to the indicator and the driving circuit 56 is driven based on this result. Namely, in the case where only one of the resist signals RL and RR is output within one scanning, it is judged that the laser writing unit 19 is inclined to the subsidiary scanning direction. The quantity of the movement in the subsidiary scanning direction from the point when one resist signal RL or RR alone begins to be output to the point when both the resist signals RL and RR begin to be output within one scanning indicates the quantity of inclination and this inclination quantity is detected as a count number of index signals ID.

The indicator 54 indicates the direction and quantity of the inclination of the scanning line L based on the signals from the micro-processor 55.

The driving circuit 56 rotates the pulse motor 19M in a direction correcting the above-mentioned inclination quantity synchronously with a picture element clock CLK described below.

The operation of the subsidiary scanning-correcting circuit 500 will now be described.

When the resist signal RL and the resist signal RR are detected within one scanning during a predetermined time from the point of the detection of the index signal ID, the micro-processor 55 emits a signal indicating no dislocation of the scanning line L from the scanning optical system to the indicator 54. Thus, "no dislocation" is shown by the indicator 54. At this time, the micro-processor 55 does not emit a driving signal to the driving circuit 56.

When the resist signal RL is detected within a certain time during one scanning from the point of detection of the index signal ID but the resist signal RR is not detected within the predetermined time, the micro-processor 55 feeds out a signal indicating dislocation of the scanning line L from the optical scanning system of the laser writing unit 19 into a direction reverse to the subsidiary scanning direction to the indicator 54 and also feeds out a driving signal corresponding to the count number of the index signals ID during the time of from the point of detection of the resist signal EL to the point of detection of both the resist signals RL and RR to the driving circuit 56. The driving circuit 56 rotates the rotor 19R of the motor 19M in the subsidiary scanning direction with the shaft 19i of the unit 19 being as the center of oscillation.

When the resist signal RL is not detected within a predetermined time from the point of detection of the index signal but the resist signal RR is detected, the micro-processor 55 emits a signal indicating dislocation of the scanning line L from the scanning optical system of the laser writing unit 19 in the subsidiary scanning direction to the indicator 54, and emits a driving signal to the driving circuit 56 according to the count number of ID signals during the period of from the point of the detection of the resist signal RR to the point of the detection of the resist signals RL and RR. At this time, the indicator 54 indicates the subsidiary direction and the count number. The driving circuit 56 rotates rotor 19R of the motor 19M to oscillate the unit 19 with the shaft 19i being as the center of oscillation.

In the above-mentioned manner, dislocation (inclination) of the scanning line L from the scanning optical system toward the subsidiary scanning direction can be adjusted. This adjustment is different from the above-mentioned adjustment of the focal point of the laser beam in that in order to improve the precision of the adjustment of dislocation in the subsidiary scanning direction, the moving speed of the photosensitive belt 10 in the subsidiary scanning direction is made sufficiently slower than the moving speed at the time of formation of an image. More specifically, by controlling the former moving speed to ½ to 1/10 of the latter moving speed, the dislocation quantity can be detected at a high precision and therefore, the adjustment of dislocation can be performed at a high precision.

In the units 19 through 22, the adjustment of dislocation in the subsidiary scanning direction need not be performed at every time of formation of an image. Preferably, the adjustment is conducted only after application of a power or on receipt of instruction of the adjustment.

With reference to FIG. 9 which is a time chart showing the operations of the subsidiary scanning-correcting circuit, the adjustment of dislocation in the subsidiary scanning direction will now be described. In FIG. 9, ID represents an index signal from an index-detecting circuit 51, RL represents a resist signal from a resist mark-detecting circuit 52 and RR represents a resist signal from a resist mark-detecting circuit 53.

If scanning and exposure are carried out while delivering the photosensitive belt 10, the index-detecting 51 outputs an index signal at every scanning based on the output signal from the photosensor 197 receiving the laser beam.

Supposing that the left end of the index signal ID is first scanning, the resist signal RL is detected at second scanning, while the resist signal RR is detected at fourth scanning. Namely, the count number of the index signals during the time of from the point of detection of the resist signal RL to the point of detection of the resist signal RR is 2 (2 scannings). At this time, the side of the photosensor FS1 of the laser writing unit 19 is dislocated by 2 scannings in the delivery direction of the photosensitive belt 10 on the upstream side (in the subsidiary scanning direction) to the side of the photosensor F2.

Accordingly, the micro-processor 55 causes the indicator 54 to indicate the subsidiary scanning direction as the dislocation direction and the count number of 2 of the ID signals, and simultaneously, rotates the rotor 19R of the motor 19M by the driving circuit 56 by oscillating the unit 19 by 2 scannings upstream of the delivery direction (in the subsidiary scanning direction) with the shaft 19i being as the center of oscillation, so that the photosensor FS2 of the unit 19 is registered with the photosensor FS1.

By conducting the above-mentioned adjustment of dislocation in the subsidiary scanning direction with respect to all of the laser writing units 19 through 22, also the position of initiation of formation of an image in the subsidiary scanning direction is adjusted in each of the laser writing units 19 through 22 and latent images formed by the respective laser writing units can be overlapped one another without any mutual shear.

If the above-mentioned subsidiary scanning-correcting circuit 500 alone is used, it sometimes happen that distances between every two adjacent laser writing unit cannot be accurately adjusted. The reason is that although the laser writing units 19 through 22 are arranged in parallel to the scanning line L, the units 19 through 22 are different from one another in the point of initiating the light exposure for forming a latent image. In this case, electric output timings of the respective laser writing units are adjusted so that the point of initiating the light exposure is the same in all of the units 19.

Figure 10:
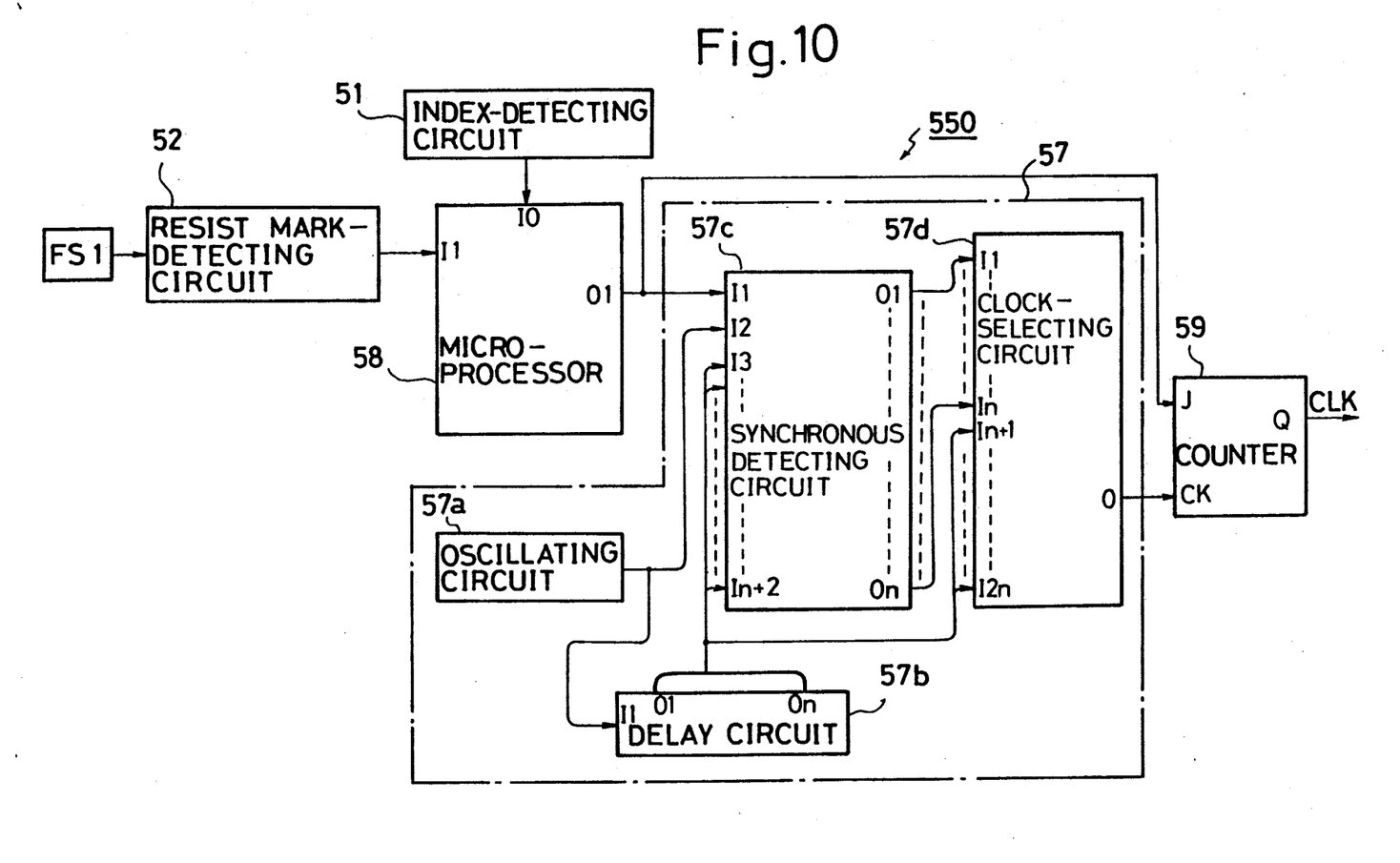
FIG. 10 is a block diagram showing a main scanning-correcting circuit for preventing dislocation of the main scanning direction.
Figure 11:
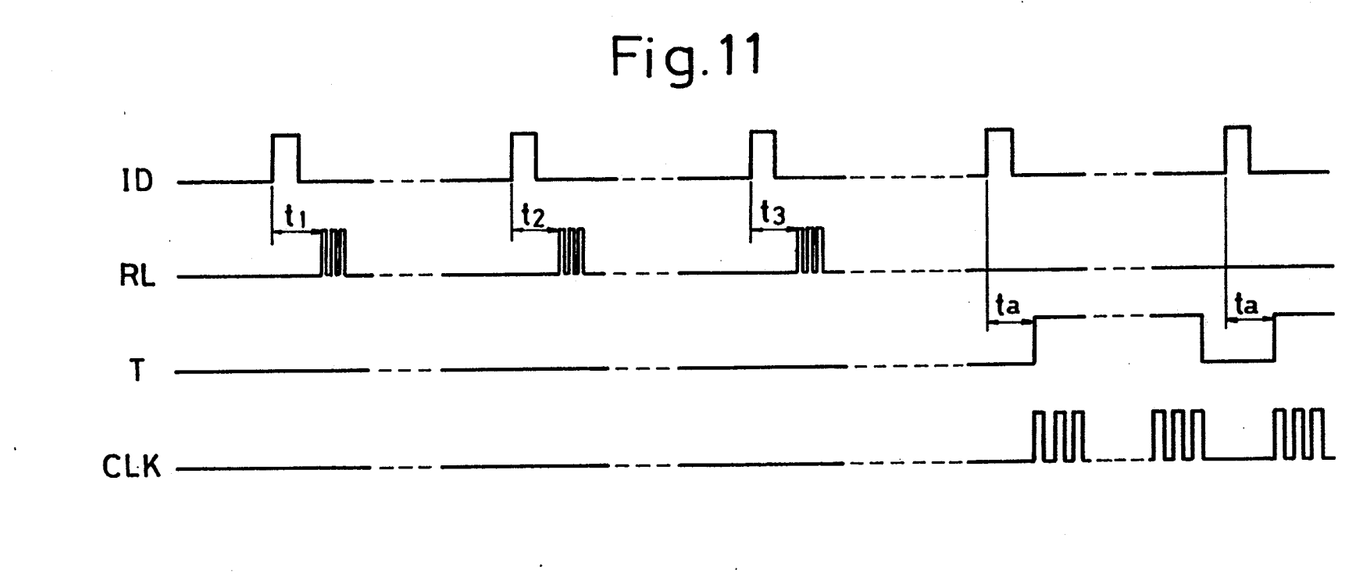
FIG. 11 is a time chart showing operations of the main scanning-correcting circuit shown in FIG. 10.

FIG. 10 is a block diagram illustrating the main scanning-correcting circuit for preventing dislocation in the main scanning direction, and FIG. 11 is a time chart illustrating the operations of the main scanning-correcting circuit. Correction of the main scanning direction is conducted every time an image is formed.

The main scanning-correcting circuit 550 comprises an index-detecting circuit 51, a resist mark-detecting circuit 52, a micro-processor 58, a clock synchronous circuit 57, and a counter 59. The index-detecting circuit 51 and the resist mark-detecting circuit 52 are as described hereinbefore. Accordingly, explanation of these circuits is omitted.

The micro-processor 58 counts over a plurality of times the time $t_i$ (i=1, 2, 3, ...) of from the point of detection of the index signal to the point of detection of the resist signal RL, and the mean value $t_a$ of these times is stored in a register. After detection of a new index signal ID, an output signal is emitted after delay of said mean value $t_a$ or $(t_a + \alpha)$.

The clock synchronous circuit outputs a picture element clock synchronous with the output signal from the micro-processor 58, and comprises an oscillating circuit 57a generating a standard picture element clock, a delay circuit 57b for forming a multiple phase clock by delaying the phase of the standard clock, a synchronous detecting circuit 57c for detecting a clock closest to the phase of the output signal from the micro-processor 58, and a clock-selecting circuit 57d for outputting one clock selected from the above-mentioned multiple phase clock based on the synchronous detecting circuit 57c.

The counter 59 outputs a picture element clock CLK from the clock-selecting circuit 57d based on the output signal from the micro-processor 58, and an image signal is output based on this picture element clock CLK.

The operations of the main scanning-correcting circuit 550 of the present embodiment will now be described with reference to time chart of FIG. 11.

The micro-processor 58 counts a plurality of times a time of from the point of inputting of the index signal ID to the point of inputting of the resist signal RL, and the mean value $t_a$ of the count numbers is stored in a register. At the time of formation of an image, when the index signal ID is input, the micro-processor 58 emits an output signal after the mean delay time $t_a$. The clock synchronous circuit 57 outputs a clock CLK having a phase most synchronous to the output signal from the micro-processor 58. The counter 59 outputs the clock CLK over a period of a predetermined time from inputting of the output signal from the micro-processor 58 (the time corresponding to the main scanning width of the image), whereby dislocation of the main scanning direction, that is dislocation of the point of initiation of the light exposure in the main scanning direction, can be prevented.

The foregoing illustration relates to the timing of writing out the main scanning. Even if polygonal mirrors of the laser writing units 19 through 22 are synchronous with one another, because of the arrangement of the optical system or the like, it is difficult to maintain the precision of the main scanning width at such a level as smaller than 1 dot. Therefore, preferably, after adjustment of the parallelism of the scanning optical system, the above-mentioned adjustment of the timing of writing out the main scanning is carried out after the adjustment of the scanning width.

The difference between the time of detection of the resist signal RL and the time of detection of the resist signal RR is used for the adjustment of the main scanning width. Namely, if this time difference is shorter than a predetermined time, the dot clock of the writing system is delayed, and if the time difference is longer than the predetermined time, the dot clock of the writing system is quickened. This adjustment of the dot clock can be performed by changing the frequency of the dot clock given to each laser beam.

The operations of the color image-forming apparatus of the present embodiment will now be described with reference to FIGS. 1 through 11.

When an electric power is applied, the photosensitive belt 10 is delivered clockwise in FIG. 1 by the rotary rollers 11 and 12, and scanning and light exposure with a laser beam are effected on the laser writing unit 19. When the laser beam transmitted through resist marks 102 and 103 is detected by the photosensors FS1 through FS8, the rotary rollers 11 and 12 stop the delivery of the photosensitive belt 10. Namely, the resist marks 102 and 103 are present on the photosensors FS1 and FS2.

In this state, the adjustment of the focal point of the laser beam is carried out. Namely, the standard pattern of the resist mark 102 is scanned with the laser beam, the intensity of the beam transmitted through the standard pattern is detected by the photosensor FS1, the signal-to-noise ratio is computed by the micro-processor 37, and the adjusting means 38 is driven to obtain a set value, whereby the laser beam is made in focus. When the laser writing unit 19 becomes in focus, the adjustment of the focal point of the subsequent laser writing unit 20 is performed, and thus, the adjustment of the focal point is conducted with respect to all of the laser writing units 19 through 22.

After completion of the adjustment of the focal point, the two rotary rollers 11 and 12 are rotated clockwise in FIG. 1 at an equal speed corresponding to 1/5 of the speed adopted at the time of formation of an image, whereby the photosensitive belt 10 is delivered in the subsidiary scanning direction X.

The laser writing units 19 through 22 perform light exposure and scanning on the photosensitive belt 10 being delivered. Dislocation in the subsidiary scanning direction is adjusted by shaking the laser writing unit in the subsidiary scanning direction by the subsidiary scanning-correcting circuit as shown in FIG. 8. Namely, if the difference between the time of detection of the resist signal RL and the time of detection of the resist signal RR is not within a predetermined time range, the motor 19M is driven according to the count number of index signals ID to correct dislocation in the subsidiary scanning direction.

After the adjustment of correcting dislocation in the subsidiary scanning direction is performed in all of the laser writing units 19 through 22, the apparatus becomes in a stand-by state.

At the time of printing, the photosensitive belt 10 is uniformly charged by the charger 15 while the photosensitive belt 10 is being moved at an image-forming speed. Just before the light exposure by the laser writing unit 19, as shown in FIG. 11, dislocation in the main scanning direction is corrected based on the index signal ID and the resist signal RL to effect imagewise light exposure of one picture. Namely, the laser writing unit 19 detects dislocation in the main scanning direction of the photosensitive belt 10 and correct this dislocation, and by irradiation with the laser beam, the imagewise light exposure is always effected from the predetermined position of the photosensitive belt 10. Then, light exposure and scanning are performed based on the yellow data of one picture by the unit 19, whereby a latent image is formed at a predetermined position on the photosensitive belt 10. The latent image is developed with a yellow toner by the developing device 23.

At subsequent formation of latent images based on magenta data, cyan data and black data, in the same manner as described above, discoloration in the main scanning direction is corrected and light exposure is initiated from the determined position of the photosensitive belt 10. Accordingly, even if the laser writing units 19 through 22 are not positioned with a strict mechanical accuracy, when formation of a latent image is repeated according to the number of colors, dislocation of the point of initiation of light exposure for forming a latent image can be prevented to prevent shear in the colors.

Preferably, the adjustment of the main scanning width (adjustment of the dot clock) is carried out after the adjustment of the focal point of the laser beam to be conducted before the stand-by state, and after the adjustment of dislocation in the subsidiary scanning direction. Subsequently, setting of the position of initiation of writing-out in the main scanning direction can also be performed before the stand-by state.

In the above-mentioned embodiment, by using a photosensitive belt 10 (image-forming medium) capable of giving an image-forming surface having radius of curvature, focussing of the laser beam and parallel arrangement of the laser writing units can be advantageously facilitated. Furthermore, by detecting the resist mark of the photosensitive belt 10 by the optical scanning by the laser writing unit, the focal point of the laser beam of each laser writing unit can be adjusted, and furthermore, the relative positions of the laser writing unit and the resist mark can be detected and an image can be registered at a high accuracy. Furthermore, since the photosensor (light-detecting means) can be arranged closely to the photosensitive belt 10 and the resist mark is arranged substantially in agreement with the focusing position, the resist mark can be detected at a high accuracy.

The resist mark can be arranged only on one end of the photosensitive belt 10 in the width direction. However, if resist marks are formed on both the ends, the resist marks can also be used for detecting inclination of the laser writing unit, as illustrated hereinbefore. The detected inclination can be corrected manually or automatically as described above.

In the present embodiment, resist marks having a standard pattern are used for adjustment of the focal point of the laser beam and for adjustment of dislocations in the main scanning direction and the subsidiary scanning direction. Marks having a standard pattern for adjustment of the focal point and resist marks for the adjustment of dislocations in the main scanning direction and the subsidiary scanning direction can be independently arranged.

In the present embodiment, a laser beam is used for the laser writing unit. However, a light-emitting diode (LED) can be used as a light source, or a light transmission quantity of a liquid crystal can be electrically controlled. The control of the light quantity is not limited to that illustrated in the above embodiment but the manner of controlling the light quantity can be changed according to the light source or the image signal.

In the present embodiment, each laser writing unit is arranged at a mechanical precision of ±0.3 to 0.5 mm. The focal point of the laser beam is adjusted, and delicate dislocation of one scanning width unit or one dot width unit is corrected. The present embodiment is especially effective for formation of a multiple color image by overlapping images, but the present embodiment can be utilized for formation of a monochromatic image.

We claim:

1. A control apparatus for an image-forming system for light-exposing and scanning an optical beam on an image-forming medium, said control apparatus comprising:

a standard pattern formed on the image-forming medium;

said standard pattern having optical beam-transmitting and non-transmitting portions arranged alternately or optical beam-reflecting and non-reflecting portions arranged alternately on the image-forming medium in a main scanning direction of said optical beam;

light-detecting means for detecting at least one of an intensity of the optical beam transmitted through at least one optical beam-transmitting portion of the standard pattern and an intensity of the optical beam reflected from at least one optical beam-reflecting portion of the standard pattern;

dislocation-detecting means for determining a dislocation of a focal point of the optical beam, based on said at least one of the light intensity detected by said light-detecting means; and adjusting means for adjusting a position of the focal point of the optical beam based on the dislocation determined by said dislocation-detection means for substantially eliminating the dislocation of the focal point, whereby the standard pattern enables accurate and rapid focusing of the optical beam by providing preset focusing limits defined by the respective light transmitting and non-transmitting portions of the standard pattern or the respective light reflecting and non-reflecting portions of the standard pattern.

2. The control apparatus according to claim 1, further comprising:

a guide member for moving and guiding the image-forming medium, said image-forming medium being slidable on said guide member, said optical beam being shiftable in a subsidiary scanning direction orthogonal to the main scanning direction of the optical beam;

said light-detecting means being disposed at a scanning position of the optical beam and a predetermined position on a sliding surface of the guide member, corresponding to a setting position of the standard pattern.

3. The control apparatus according to claim 1, wherein:

the dislocation-detecting means for determining the dislocation of the focal point, determines a maximum value Smax, and a minimum value Smin, of the at least one intensity of the optical beam detected by the light-detecting means;

said dislocation-detecting means calculates a signal-to-noise ratio from Smax and Smin in accordance with the following formula:

$$\text{signal-to-noise ratio} = \frac{Smax - Smin}{Smax + Smin};$$

and wherein said adjusting means adjusts the position of the focal point of the optical beam so that the signal-to-noise ratio is at least one of a predetermined value and within a predetermined range of signal-to-noise ratios.

4. The control apparatus according to claim 1, further comprising:

a lens system for forming the optical beam, said lens system including a collimator lens; and said adjusting means moving the collimator lens in a direction of an optical axis of the optical beam, to adjust the position of the focal point of the optical beam.

5. The control apparatus according to claim 1, wherein a latent image is formed on a surface of the image-forming medium by exposure of the image-forming medium to a scanning optical beam, the image-forming system further comprising:

developing means for developing the latent image into a toner image; and transfer means for transferring the toner image formed on the surface of the image-forming medium onto a transfer material.

6. The control apparatus according to claim 1, wherein stop means are provided for stopping a scanning in a subsidiary scanning direction orthogonal to the main scanning direction of the optical beam during an adjustment of the position of the focal point by said adjusting means.

7. The control apparatus according to claim 1, wherein:

the standard pattern also is used as a standard resist mark for determining a position for initiation of at least one scanning in a direction of the main scanning direction of the optical beam and in a subsidiary scanning direction orthogonal to the main scanning direction.

8. The control apparatus according to claim 1, wherein:

the image-forming medium comprises an annular medium formed by bonding together a first and a second end portion of a belt-like image-forming medium;

the annular image-forming medium is movable relative to the main scanning direction of the optical beam; and the standard pattern is formed at a predetermined position close to a bonded portion of the image-forming medium, said bonded portion bonding the first and the second end portions of the image-forming medium.

9. The control apparatus according to claim 8, further comprising:

cleaning means for cleaning the annular medium, including the standard pattern, after an image forming operation is completed.

10. The control apparatus according to claim 1, wherein the standard pattern is formed on a scanning-initiating side of one of the first and the second end portions of the image-forming medium in a direction that corresponds to the main scanning direction of the optical beam.

11. A control method for an image-forming system in which an optical beam is exposed and scanned on an image-forming medium, said method comprising the steps of:
  detecting at least one of an intensity of the optical beam the image-forming medium in a main scanning direction of said optical beam;
  light-detecting means for detecting at least one of an intensity of the optical beam transmitted through at least one optical beam-transmitting portion of the standard pattern and an intensity of the optical beam reflected from at least one optical beam-reflecting portion of the standard pattern;
  dislocation-detecting means for determining a dislocation of a focal point of the optical beam, based on said at least one of the light intensity detected by said light-detecting means; and
  adjusting means for adjusting a position of the focal point of the optical beam based on the dislocation determined by said dislocation-detection means for substantially eliminating the dislocation of the focal point, whereby the standard pattern enables accurate and rapid focusing of the optical beam by providing preset focusing limits defined by the respective light transmitting and non-transmitting portions of the standard pattern or the respective light reflecting and non-reflecting portions of the standard pattern.

12. The control method according to claim 11, further comprising:
  guiding and slidably moving the image-forming medium on a guide member while shifting the optical beam on said image-forming medium in a subsidiary scanning direction orthogonal to the main scanning direction of the optical beam; and wherein
  the detecting step for detecting the intensity of the optical beam transmitted through or the optical beam reflected from a portion of the standard pattern includes the step of positioning a detecting means at a scanning position of the optical beam and at a predetermined position on a sliding surface of the guide member that corresponds to a start position of the standard pattern.

13. The control method according to claim 11, wherein the detecting step includes the steps of:
  measuring the intensity of the optical beam transmitted through or the optical beam reflected from a portion of the standard pattern;
  determining a maximum value Smax and a minimum value Smin of the thus detected intensity; and
  calculating a signal-to-noise ratio from Smax and Smin in accordance with the following formula:

$$\text{signal-to-noise ratio} = \frac{Smax - Smin}{Smax + Smin};$$

and wherein
  the determining step determines the dislocation of the focal point of the optical beam by comparing the thus calculated signal-to-noise ratio with at least one of a predetermined value and a range of the signal-to-noise ratios.

14. The control method according to claim 11, further comprising:
  providing an optical beam-forming lens system having a collimator lens;
  moving said collimator lens in a direction of an optical axis of the optical beam; and
  adjusting the position of the focal point.

15. The control method according to claim 11, further comprising:
  forming an electrostatic latent image on a surface of the image-forming medium by exposing and scanning the optical beam on the image-forming medium;
  converting the electrostatic latent image into a toner image; and
  then transferring the toner image onto a transfer material.

16. The control method according to claim 11, wherein when the position of the focal point is adjusted in said adjusting step to adjust the focal point, based on the determined dislocation of the focal point, a scanning in a subsidiary scanning direction orthogonal to the main scanning direction of the optical beam is stopped.

17. The control method according to claim 11, further comprising:
  using the standard pattern as a standard resist mark for determining a position of initiation of a scanning of the optical beam a direction that corresponds to a scanning in one of the main scanning direction of the optical beam and a scanning in a subsidiary scanning direction orthogonal to the main scanning direction of the optical beam.

18. The control method according to claim 11, further comprising:
  forming the image-forming medium into an annular image-forming medium by bonding a first and a second end portion of a belt-like image-forming medium to each other;
  moving the image-forming medium in a direction corresponding to the main scanning direction of the optical beam; and
  forming the standard pattern on said image-forming medium at a predetermined position close to a bonded portion of the image-forming medium where the first and second end portions of said belt-like image-forming medium are bonded together.

19. The control method according to claim 18, comprising:
  cleaning the annular image forming medium including the standard pattern, with a cleaning means after an image forming operation is completed.

20. The control method according to claim 11, wherein the standard pattern is formed on a scanning-initiating side of the bonded first and second end portions of the image-forming medium and in a direction corresponding to the main scanning direction of the optical beam.

* * * * *

UNITED STATES PATENT AND TRADEMARK OFFICE
CERTIFICATE OF CORRECTION

PATENT NO. : 5,257,047

DATED : October 26, 1993

INVENTOR(S) : HANEDA et al

It is certified that error appears in the above-identified patent and that said Letters Patent is hereby corrected as shown below:

Column 19, delete lines 8 - 30 (claim 11) and insert :

-- beam transmitted through and an intensity of an optical beam reflected by a standard pattern having optical beam-transmitting and non-transmitting portions arranged alternately or optical beam-reflecting and non-reflecting portions arranged alternately in a main scanning direction of the optical beam, said standard pattern being formed on the image-forming medium;

determining a dislocation of a focal point of the optical beam based on the thus detected at least one intensity; and     adjusting a position of the focal point of the optical beam based on the determined dislocation of the focal point to eliminate the dislocation of the focal point and thus focus the beam, whereby the standard pattern enables accurate and rapid focusing of the optical beam by providing preset focusing limits defined by the respective light transmitting and non-transmitting portions of the standard pattern or the respective light reflecting and non-reflecting portions of the standard pattern.--

Signed and Sealed this

Twenty-sixth Day of September, 1995

*Attest:*

BRUCE LEHMAN

*Attesting Officer*      *Commissioner of Patents and Trademarks*